US008454436B2

(12) United States Patent
Klostermann et al.

(10) Patent No.: US 8,454,436 B2
(45) Date of Patent: Jun. 4, 2013

(54) GAMING MACHINE WITH MOVABLE DISPLAY SCREEN

(75) Inventors: Gregory E. Klostermann, Arlington Heights, IL (US); Norman R. Wurz, Des Plaines, IL (US)

(73) Assignee: WMS Gaming Inc., Waukegan, IL (US)

( * ) Notice: Subject to any disclaimer, the term of this patent is extended or adjusted under 35 U.S.C. 154(b) by 1015 days.

(21) Appl. No.: 12/490,792

(22) Filed: Jun. 24, 2009

(65) Prior Publication Data

US 2009/0325692 A1 Dec. 31, 2009

Related U.S. Application Data

(60) Provisional application No. 61/133,220, filed on Jun. 26, 2008.

(51) Int. Cl.
*A63F 9/24* (2006.01)
*A63F 13/00* (2006.01)

(52) U.S. Cl.
USPC .................. 463/31; 463/16; 463/20; 463/32; 463/33; 463/36

(58) Field of Classification Search
USPC .................................. 463/16, 20, 31-33, 36
See application file for complete search history.

(56) References Cited

U.S. PATENT DOCUMENTS 4,440,457 A 4/1984 Fogelman et al.
4,718,672 A 1/1988 Okada ...................... 273/143 R
4,742,478 A 5/1988 Nigro et al.
4,814,759 A 3/1989 Gombrich et al.
5,177,616 A * 1/1993 Riday .......................... 348/837
5,229,920 A 7/1993 Spaniol et al.
5,255,214 A 10/1993 Ma
5,456,468 A 10/1995 Stringfellow et al.
5,559,670 A * 9/1996 Flint et al. ................ 361/679.06
5,661,632 A 8/1997 Register ........................ 361/683
5,708,561 A 1/1998 Huilgol et al.
5,813,914 A 9/1998 McKay et al.
6,011,585 A 1/2000 Anderson ..................... 348/272

(Continued)

FOREIGN PATENT DOCUMENTS

WO WO 02/078803 10/2002
WO WO 03/028829 4/2003

OTHER PUBLICATIONS

Bally Gaming Systems, "EVO Hybrid", www.ballygaming.com, (2000), 4 pages.

(Continued)

*Primary Examiner* — Dmitry Suhol
*Assistant Examiner* — Ryan Hsu
(74) *Attorney, Agent, or Firm* — Nixon Peabody LLP

(57) ABSTRACT

A method, implemented by an electronic gaming machine (EGM), includes providing an electronic display mounted to the cabinet of the EGM and disposed in a normal operational position to portray a wagering game to a user, the display in the normal operational position having an orientation of one of landscape or portrait. The display is moved from the normal operational position to a maintenance position in order to permit access for a technician to components in a space in the cabinet behind the display when the latter is in the normal operational position, the display in the maintenance position having an orientation of the other of landscape or portrait, the display in the maintenance position displaying information to the technician.

25 Claims, 4 Drawing Sheets

U.S. PATENT DOCUMENTS

| | | | | |
|---|---|---|---|---|
| 6,016,171 | A | 1/2000 | Tsao | |
| 6,068,101 | A | 5/2000 | Dickenson et al. | |
| 6,115,025 | A | 9/2000 | Buxton et al. | 345/126 |
| 6,116,597 | A | 9/2000 | Rowe et al. | |
| 6,135,884 | A | 10/2000 | Hedrick et al. | |
| 6,164,645 | A | 12/2000 | Weiss | |
| 6,201,532 | B1 | 3/2001 | Tode et al. | |
| 6,233,138 | B1 | 5/2001 | Osgood | |
| 6,254,481 | B1 | 7/2001 | Jaffe | |
| 6,262,885 | B1 | 7/2001 | Emma et al. | |
| 6,275,376 | B1 | 8/2001 | Moon | |
| 6,302,612 | B1 | 10/2001 | Fowler et al. | |
| D454,122 | S | 3/2002 | Hori et al. | |
| 6,392,877 | B1 | 5/2002 | Iredale | |
| 6,464,195 | B1 | 10/2002 | Hildebrandt | |
| 6,475,087 | B1 | 11/2002 | Cole | |
| 6,504,707 | B2 | 1/2003 | Agata et al. | |
| 6,522,529 | B1 | 2/2003 | Huilgol et al. | |
| 6,572,204 | B1 | 6/2003 | Hedrick et al. | |
| D477,850 | S | 7/2003 | Hussaini et al. | |
| 6,623,006 | B2 | 9/2003 | Weiss | 273/138.2 |
| 6,638,166 | B2 | 10/2003 | Hedrick et al. | |
| D482,669 | S | 11/2003 | Hori et al. | |
| 6,646,695 | B1 | 11/2003 | Gauselmann | |
| 6,663,155 | B1 | 12/2003 | Malone et al. | |
| 6,665,175 | B1 | 12/2003 | deBoer et al. | |
| 6,688,984 | B2 | 2/2004 | Cole | |
| 6,699,128 | B1 | 3/2004 | Beadell et al. | 463/46 |
| 6,711,004 | B2 | 3/2004 | Yen et al. | |
| 6,724,317 | B1 | 4/2004 | Kitano et al. | |
| D493,154 | S | 7/2004 | Hussaini et al. | |
| 6,764,400 | B1 * | 7/2004 | Yokoi et al. | 463/36 |
| D497,886 | S | 11/2004 | Hussaini et al. | |
| 6,827,409 | B2 | 12/2004 | Michael | |
| 6,842,338 | B2 | 1/2005 | Iredale | |
| 6,860,814 | B2 | 3/2005 | Cole | 463/46 |
| 6,962,528 | B2 | 11/2005 | Yokota | |
| 6,976,919 | B2 | 12/2005 | Cole | |
| 7,055,790 | B2 | 6/2006 | Schroeter | |
| 7,066,816 | B2 | 6/2006 | Gauselmann | 463/29 |
| 7,082,028 | B2 | 7/2006 | Huilgol et al. | |
| 7,267,613 | B2 | 9/2007 | Cole | |
| 7,387,572 | B2 | 6/2008 | Hanchar | |
| 2002/0041133 | A1 | 4/2002 | Hedrick et al. | |
| 2002/0060124 | A1 | 5/2002 | Thompson | |
| 2004/0018870 | A1 | 1/2004 | Cole | |
| 2004/0018877 | A1 | 1/2004 | Tastad et al. | |
| 2004/0053699 | A1 | 3/2004 | Rasmussen et al. | |
| 2004/0061284 | A1 | 4/2004 | Satoh | |
| 2004/0125549 | A1 | 7/2004 | Iredale | |
| 2004/0141095 | A1 | 7/2004 | Quinno et al. | |
| 2004/0201595 | A1 | 10/2004 | Manchester | 345/649 |
| 2005/0059496 | A1 | 3/2005 | Hanchar | |
| 2005/0104848 | A1 * | 5/2005 | Yamaguchi et al. | 345/156 |
| 2005/0143124 | A1 * | 6/2005 | Kennedy et al. | 455/556.1 |
| 2005/0168499 | A1 | 8/2005 | Williams et al. | |
| 2005/0168926 | A1 | 8/2005 | Lee et al. | |
| 2005/0277477 | A1 | 12/2005 | Hajder et al. | 463/46 |
| 2006/0287112 | A1 | 12/2006 | Mallory et al. | 463/46 |
| 2007/0111776 | A1 | 5/2007 | Griswold et al. | 463/16 |
| 2007/0238531 | A1 | 10/2007 | Taxon | 463/46 |
| 2007/0252853 | A1 | 11/2007 | Park et al. | 345/649 |
| 2007/0273610 | A1 | 11/2007 | Baillot | 345/8 |
| 2008/0013053 | A1 | 1/2008 | Anson | 353/69 |
| 2008/0055491 | A1 | 3/2008 | Gordon et al. | 348/836 |
| 2008/0059888 | A1 * | 3/2008 | Dunko | 715/744 |
| 2008/0102935 | A1 * | 5/2008 | Finnimore | 463/25 |
| 2008/0113754 | A1 | 5/2008 | Nelson | 463/20 |
| 2008/0113821 | A1 * | 5/2008 | Beadell et al. | 463/46 |

OTHER PUBLICATIONS

WMS Gaming Inc., “3RV™”, *Product Sheet*, (2002 or earlier), 1 page.

* cited by examiner

GAMING MACHINE WITH MOVABLE DISPLAY SCREEN

CROSS-REFERENCE TO RELATED APPLICATIONS

This application claims the benefit of U.S. patent application Ser. No. 61/133,220, filed Jun. 26, 2008, which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to electronic gaming machines (EGMs) that support wagering on wagering games, and more particularly to temporary relocation of a screen of the EGM during maintenance of the EGM to permit access for a technician to components disposed behind the screen in its normal operational position.

BACKGROUND OF THE INVENTION

Gaming machines, such as slot machines and video poker machines, have been a cornerstone of the gaming industry for several years. EGMs, especially microprocessor-based gaming machines provide flexibility through software control and the ability to communicate data and download software. Some EGMs have an electronic display screen, e.g. an LCD screen, attached to the cabinet that houses the EGM. The electronic display screen is normally used to convey information to the game player. Various components may be mounted in the cabinet behind the display screen. In order to perform maintenance or trouble shooting of such components disposed behind the screen of the EGM, the screen is disconnected from operation and then physically removed from the EGM.

SUMMARY OF THE INVENTION

According to one aspect of the present invention, an embodiment includes a method, implemented by an electronic gaming machine (EGM), that includes providing an electronic display mounted to the cabinet of the EGM and disposed in a normal operational position to portray a wagering game to a user, the display in the normal operational position having an orientation of one of landscape or portrait. The display is moved from the normal operational position to a maintenance position in order to permit access for a technician to components in a space in the cabinet behind the display when the latter is in the normal operational position, the display in the maintenance position having an orientation of the other of landscape or portrait, the display in the maintenance position displaying information to the technician. A first area defined by the perimeter of the display in the normal operational position does not substantially overlap a second area defined by the perimeter of the display in the maintenance position so that access for servicing components of the EGM located in the first area is provided to the technician.

According to another aspect of the invention, an electronic gaming machine that supports wagering on games includes a cabinet, microprocessor based system disposed in the cabinet that includes a central processing unit and memory for storing operating instructions and image data, and an electronic display mounted to the cabinet. The electronic display renders images on a screen based on the image data. The electronic display is disposed in a normal operational position to portray a wagering game to a user. The display in the normal operational position has an orientation of one of landscape or portrait. The display is configured to be movable to a maintenance position in order to permit access for a technician to components in a space in the cabinet behind the display when the display is in the normal operational position. The display in the maintenance position has an orientation of the other of landscape or portrait. The display in the maintenance position displays information to the technician. A first area defined by the perimeter of the display at the normal operational position does not substantially overlap a second area defined by the perimeter of the display at the maintenance position so that access for servicing components of the EGM located in the first area is provided to the technician.

According to yet another aspect of the present invention, an electronic gaming machine that supports wagering on games includes a microprocessor means for controlling the operation of a game and performing maintenance actions, a memory means for storing operating instructions and image data, an electronic display for displaying images on a screen based on the image data, and a means for rendering images on the screen based on the image data. The electronic display is disposed in a normal operational position to portray a wagering game to a user. The display in the normal operational position has an orientation of one of landscape or portrait. The display is configured to be movable to a maintenance position thereby allowing access for a technician to components in a space in the cabinet behind the display when the display is in the normal operational position. The display in the maintenance position has an orientation of the other of landscape or portrait. The display in the maintenance position displays information to the technician.

According to another aspect of the present invention, a method is implemented by an electronic gaming machine having a cabinet. The method includes the steps of providing an electronic display rotatably mounted to the cabinet and disposed in a normal operational position to portray a wagering game to a user. The display has a screen that is disposed in a first plane in the normal operational position of the display. The display is rotated from the normal operational position to a maintenance position in order to permit access for a technician to components in a space in the cabinet behind the display when the display is in the normal operational position. The screen of the display remains substantially parallel to the first plane throughout the rotation of the display to the maintenance position.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
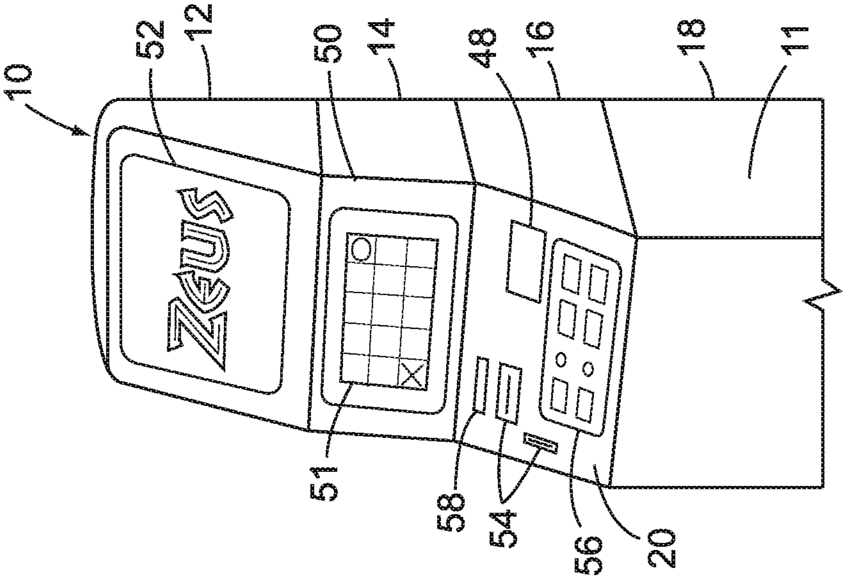
FIG. 1 is a perspective view of a representative EGM suited for incorporation of an embodiment of the present invention.

Referring to FIG. 1, an illustrative gaming machine 10 is housed in a cabinet 11 that remains fixed during the play of a game by a user. The gaming machine 10 is shown in FIG. 1 in its normal configuration and orientation, i.e. ready for play by a user of its supported game. It includes a top section 12 that contains a secondary display 52, a section 14 below the top section that includes a primary video display 50, an intermediate section 16 that contains a hinged panel 20, and a base section 18. The video display 50 may include various types of electronic displays, for example, a liquid crystal display, OLED display, or other type of flat panel display. In this example, the secondary display 52 displays general information concerning the identity of the game "ZEUS" but could display other game related information. The primary display 50 displays indicia associated with the play the game to the user, e.g. in this example a series of simulated reels 51 are displayed. If a video poker game was the implemented game, display 50 would display cards dealt to the user during the play of a hand. Other information would be displayed to the user by display 50 depending upon the type of game for which the EGM is configured. Display 50 is also used to show text and/or images associated with diagnostic and service procedures.

A variety of components associated with the operation of the EGM are mounted to the hinged panel 20 that covers section 16 and has a frame portion 21 that forms a frame around the front of display 50. A payoff mechanism 48 may disburse money or print a receipt for credits accumulated by the user. A money and/or credit detector 54 accepts money, printed credit receipts, and/or credit cards provided by the user during the play of the game. A player input device 56 may consist of a panel of various types of buttons or other input mechanisms that permit the user to communicate selections and actions to be taken in association with the play of the game. A player identification reader 58 is adapted to read a card or other token associated with the identity of a user.

Figure 2:
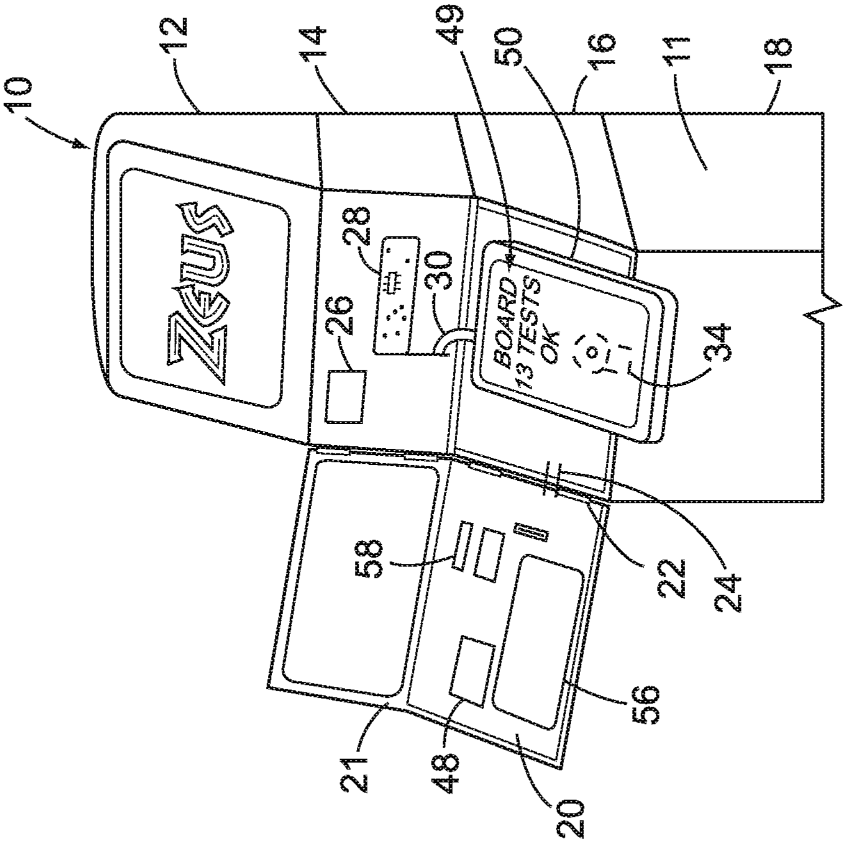
FIG. 2 is another perspective view of the representative EGM of FIG. 1 with the EGM cabinet opened for access during service.

FIG. 2 shows the EGM 10 in a maintenance configuration and orientation, i.e. various elements of the EGM have been reoriented or relocated to provide internal access by a service technician. Panel 20 has been opened and swung away from its associated section 16 about hinges 22 that are disposed near the left edge of panel 20 and mounted to a generally vertical support member of the cabinet in section 16. A cable 24 contains a plurality of wires that connect the various components mounted to the panel 20 to other associated components not located on panel 20.

Figure 4:
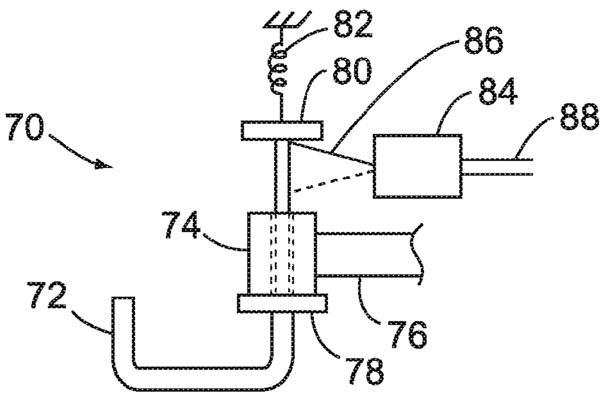
FIG. 4 shows an exemplary mechanism for supporting a temporarily relocated display that incorporates an orientation sensor in accordance with an embodiment of the present invention.

The primary display 50 is relocated away from the area of section 14 of cabinet 11 so as to provide access to the service technician to components disposed within section 14 of the cabinet 11, e.g. representative component 26, and representative printed circuit board 28. It will be understood by those skilled in the art that components and printed circuit boards of various types may be disposed within section 14 and need not only be associated with operation of display 50. A cable 30 contains wires that connect display 50 with a display driver module that controls the display of images on the screen 50. It will be noted that the display 50 is mounted in a landscape orientation as shown in FIG. 1 during normal game play. However, it is convenient to swing and rotate the display 50 by 90 degrees down and away from the opening to section 14 so that it is supported in a portrait orientation, i.e. the longer dimension of the rectangular display has a generally vertical orientation with the right end in the landscape orientation becoming the bottom in the portrait orientation. The display 50 is preferably supported by a mount, such as shown in FIG. 4 as a hook-like element, attached near the top rear edge of display 50. The mount is attached to a horizontal structural support at the lower front of section 14.

It will be understood by those skilled in the art that indicia and/or information conveyed by display 50 while mounted as shown in FIG. 2 will have an improper orientation to be easily conveyed to a service technician. That is, information will be displayed in a landscape format which is normally appropriate for the display 50 when mounted for normal operation as seen in FIG. 1 in a landscape orientation. However, because the display 50 is temporarily mounted in a portrait orientation as shown in FIG. 2, the information displayed in a landscape format on the portrait oriented display 50 will be rotated 90 degrees from a normal desired viewing perspective. For example, lines of text would be displayed in vertical columns running from top to bottom on display 50 as seen in FIG. 2 due to the physical 90 degree rotation of display 50.

In accordance with an embodiment of the present invention, this problem is overcome by automatically sensing the changed physical orientation of display 50 and causing the driver module for the display 50 to present information in a portrait orientation, e.g. so that lines of text 49 are presented on the screen of display 50 as shown in FIG. 2 as normal horizontal rows running from left to right. A second area defined by the perimeter of the display 50 at the second location as shown in FIG. 2 does not substantially overlap, i.e. no more than 10% overlap, a first area defined by the perimeter of the display 50 as shown mounted to the cabinet 11 in FIG. 1 so that open access for servicing components of the EGM located in the first area (in section 14 of cabinet 11) is provided to the technician.

Figure 3:
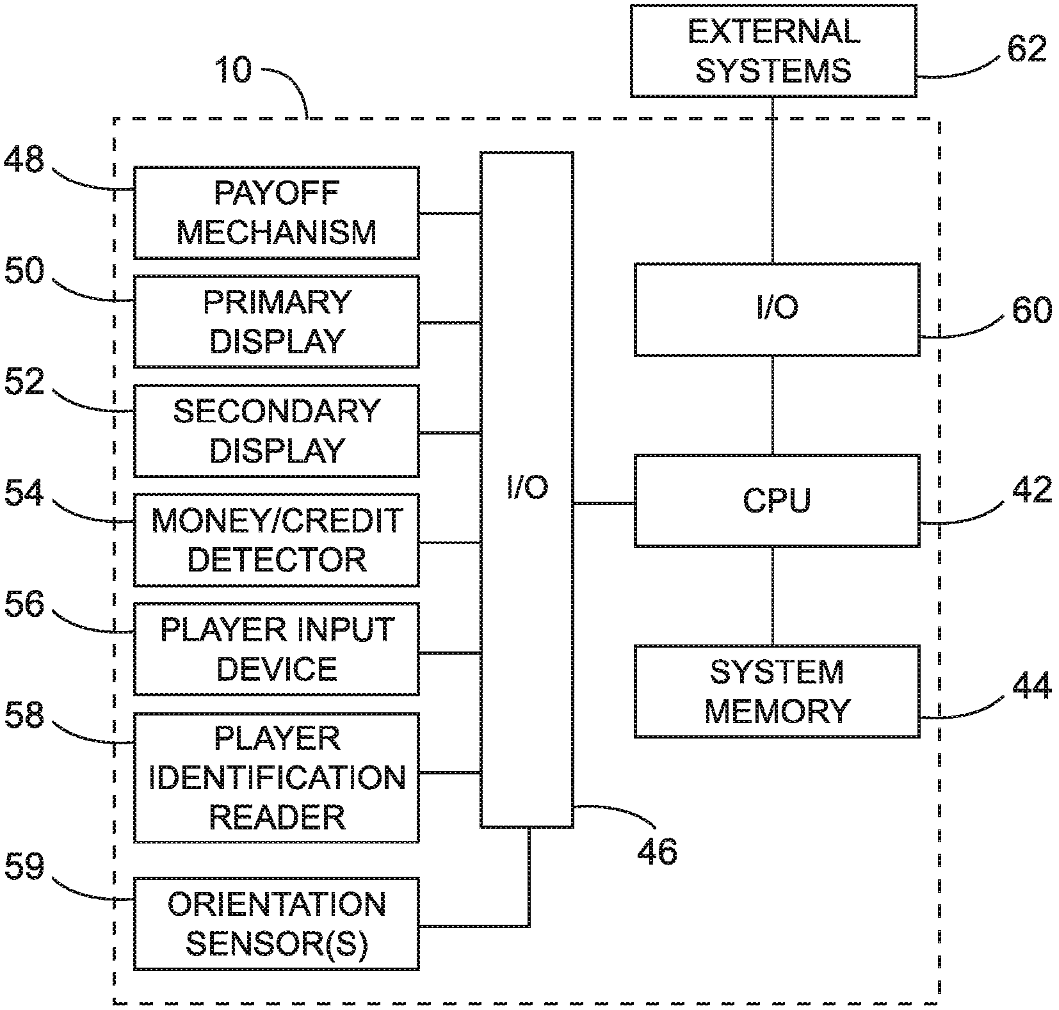
FIG. 3 is a block diagram of the representative EGM.

FIG. 3 is a functional block diagram of the EGM 10. Some elements in FIG. 3 have been previously described and will not be further addressed. The blocks representing primary display 50 and the secondary display 52 in FIG. 3 each preferably include a driver module, e.g. associated video display card, utilized to render images on the respective screens. A central processing unit (CPU) 42 comprising, for example, a microprocessor is supported by system memory 44 that may include read-only memory, random access memory and a nonvolatile storage memory such as a hard drive. The CPU 42 operates under the control of stored software instructions to sense user inputs and control the operation of the game, including actions and interactions associated with the operation of the EGM. An input/output module 46 supports internal communications between the CPU 42 and various input and output devices as shown. At least one orientation sensor 59 is coupled to the input/output module 46 and provides a signal detectable by the CPU 42 indicating that the physical location of display 50 has changed and that image orientation should be changed. These devices are intended to be representative of a variety of input and output devices that may be employed by the EGM. A communications input/output device 60 provides an interface between the CPU 42 and external systems 62 enabling bidirectional wired and wireless communications for EGM 40 with external devices.

In one illustrative embodiment, the orientation sensor 59 may comprise a pushbutton switch 34 (see FIG. 2) mounted to a lower horizontal structural element at the front of section 16 such that the pushbutton actuator is engaged and depressed by display 50 when the latter is disposed in a physical portrait orientation position as shown in FIG. 2. The actuator of the pushbutton switch is not depressed when the display 50 as mounted in its normal position as shown in FIG. 1. Upon the CPU 42 sensing the signal provided by switch 34 indicating that display 50 has been relocated in a portrait orientation, the CPU 42 provides instructions to the corresponding display driver associated with display 50 causing images to be displayed in a portrait format instead of a landscape format. This requires that the display driver have the capability of selectably rotating the images to be displayed. If the display driver does not have this capability, then the CPU will implement a software routine that rotates the image to be displayed prior to transmitting the image to the display driver. Thus, the technician is provided during service operations, when display 50 is in the orientation as shown in FIG. 2, with indicia and text in a portrait format. This can include viewing the operation of the game or information related to diagnostic tests. This allows displayed information to be easily and quickly conveyed to the technician since it is provided in a normal English language left to right orientation.

Other types of orientation sensors could also be utilized to automatically sense a change of physical orientation. For example, an inertial sensor, an accelerometer or a mercury switch could be attached to or associated with display 50 in order to provide a signal indicative of a need for an orientation change. Further, other types of contact switches or proximity sensing switches, e.g. magnetic, capacitance, etc., could also be utilized.

FIG. 4 shows an alternative mechanism 70 for automatically sensing that the display 50 is in a relocated position and orientation such a shown in FIG. 2. A J-shaped hook 72 is mounted to a support member 76 of the cabinet by a bushing 74 that permits the hook 72 to slide along the longitudinal axis of the bushing. A stop 78 is mounted to the hook 72 at an intermediate point along the shank of the hook 72 at one end of the bushing 74; another stop 80 is mounted near the distal end of the shank of the hook 72 adjacent the other end of the bushing 74. These stops limit the extent of travel of the shank of the hook 72 along the bushing 74. A spring 82 is connected to stop 80 and to a fixed anchor point of the cabinet. The spring provides an upward force causing the stop 78 to be normally biased to abut one end of the bushing 74 as shown in FIG. 4. A microswitch 84 includes a lever arm 86 and has connection wires 88 that provide an open or closed electrical path (different states) indicative of whether the lever arm is in its normal position is shown by the solid line 86, or in its alternate state as indicated by the lever arm shown as a dashed line. The microswitch is mounted to an element of the cabinet so that the distal end of the lever arm is engaged by stop 80 and deflected downward to the position as shown by the dashed line when the hook 72 is moved downward so that stop 80 engages the upper end of the bushing 74.

The mechanism 70 is preferably oriented relative to the EGM cabinet so that the distal end of the J-hook 72 extends outward near the front of the cabinet suitable to be engaged by a strap or other support structure mounted to the display 50. Thus, the hook 72 supports the display 50 while it is in the relocated portrait orientation as shown in FIG. 2. While supporting the display, the hook 72 is deflected downward due to the weight of the display 50 causing the lever arm 86 of the microswitch to also be deflected to its dashed line position as shown in FIG. 4. This causes a corresponding change of the open/closed state of the microswitch which provides a signal coupled to the CPU 42 indicating that the display 50 is in its relocated position and that the format for displayed images should be changed from landscape to portrait orientation. Other types of mechanisms can be utilized to serve a similar purpose to the mechanism as shown in FIG. 4, i.e. support the display when in its relocated position and provide a signal indicative of this condition.

Figure 5:
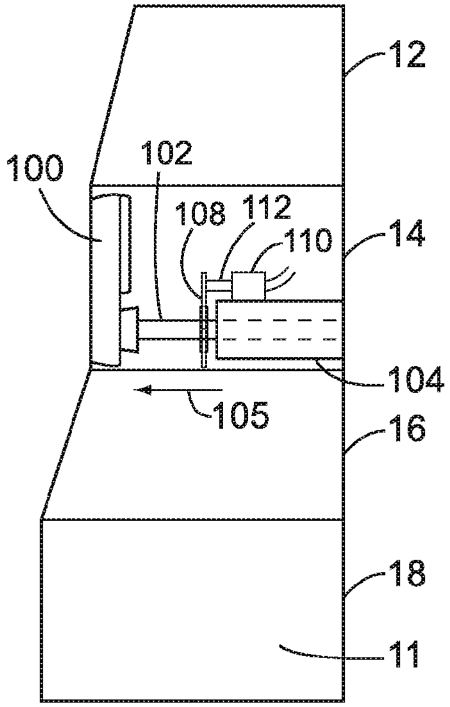
FIGS. 5 and 6 show another exemplary embodiment for supporting a temporarily relocated display and an orientation sensor mechanism in accordance with an embodiment of the present invention.
Figure 6:
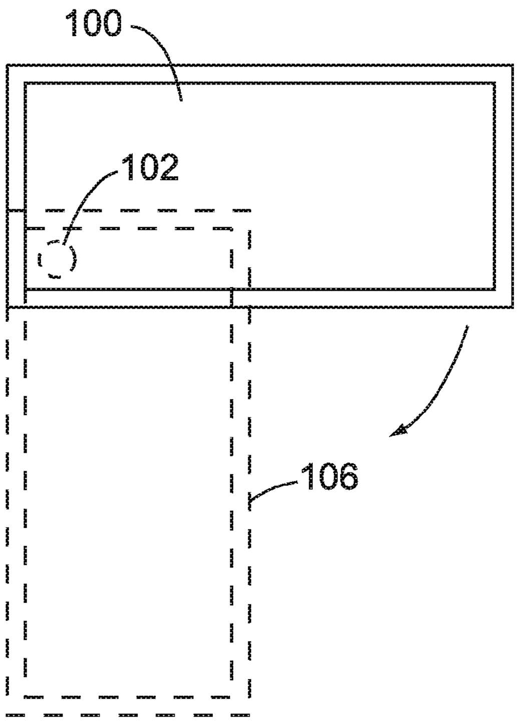

FIGS. 5 and 6 illustrate a further embodiment in accordance with the present invention. In this embodiment a display screen 100 is mounted to an extendable and rotatable support rod 102 which is in turn supported by a cylindrical sleeve 104 in section 14 of the EGM. As indicated by arrow 105 the support rod 102 and the supported display 100 can be extended in the forward direction and the display permitted to rotate 90 degrees clockwise to occupy the position 106 thereby permitting access by a technician to section 14. A circular plate 108 is mounted to rod 102 so that the plate 108 almost abuts the end of the sleeve 104 when the display 100 is in its normal assembled position as shown in FIG. 5. A pushbutton switch 110 is mounted rearward of plate 108 and disposed so that the actuator button 112 of the switch 110 is engaged causing the switch to be actuated while the display 100 is in its normal position as shown in FIG. 5. As the display and rod 102 are moved forward away from sleeve 104 into a maintenance position, the plate 108 disengages the actuator button 112 of switch 110 causing the switch 110 to no longer be actuated, i.e. the open/close state of the switch is in one state when the display screen 100 is in its normal operating position as shown in FIG. 5 and is in the other state when the display screen is moved to the maintenance position 106. This switch 110 functions as orientation sensor 59. The illustrative display is rectangular and the single extendable rod is attached to the display at a location closer to a corner of the display than to the center of the display so that the rotation of the display to its maintenance position causes the display to swing substantially away from the space in the cabinet behind the display when it is in the normal operational position. The screen of the display in its normal operational position defines a plane, and the screen remains substantially parallel to that plane as it is moved to the maintenance position.

Figure 7:
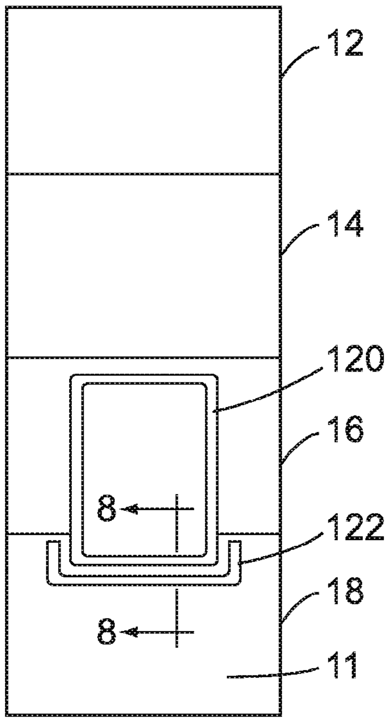
FIGS. 7 and 8 show a further exemplary embodiment for supporting a temporarily relocated display and an orientation sensor mechanism in accordance with an embodiment of the present invention.
Figure 8:
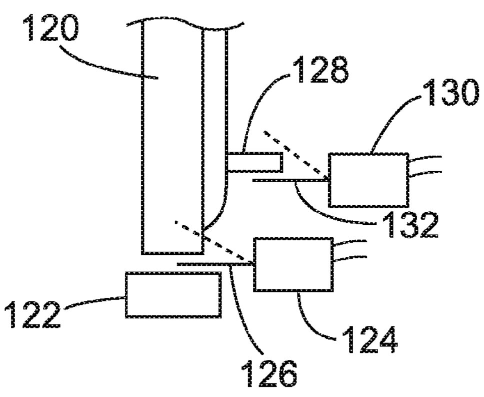

FIGS. 7 and 8 illustrate another embodiment in accordance with the present invention. In this embodiment a display screen 120 which is normally mounted in a landscape orientation in section 14 of the EGM has been manually relocated to the portrait orientation position as shown in FIG. 7. In this relocated position access to section 14 is provided to a technician. The display screen has been rotated 90 degrees so that its right edge when in the landscape position is now the bottom edge in the portrait orientation. A U-shaped support bracket 122 is mounted to a supporting frame member of the EGM and is dimensioned to engage and support the shorter edge of the display screen 120 as shown in FIG. 7. In this embodiment the display screen 120 may be connected by a cable of sufficient length to permit its relocation from its normal landscape position to the illustrated portrait position while remaining in operation.

FIG. 8 is an illustrative cross-sectional view about line 8-8 of FIG. 7 that is intended to show exemplary orientation sensors associated with this embodiment. An illustrative microswitch 124 is disposed near supporting bracket 122 so that its actuator arm 126 moves from the normally biased up position indicated by the dashed actuator line to a down position when engaged by the bottom edge of display screen 120. This causes the state of the microswitch 124 to change from one state to another thereby providing an orientation signal indicating that the display screen 120 has been relocated and is in the portrait orientation.

Another microswitch 130 is mounted rearward of the display screen 120 and provides a signal indicating whether the display screen 120 has been repositioned in a portrait orientation in supporting bracket 122 by being rotated 90 degrees clockwise or 90 degrees counterclockwise, i.e. whether the right edge of the screen when it is in its landscape position is now the bottom or the top in the portrait orientation. The microswitch 130 is disposed so that its actuator arm 132, which is normally biased in the up position as shown in its dashed line position, is moved to its solid line position when the actuator arm 132 is engaged by a protruding flange or abutment 128 from the rear of the display screen 120 when the latter is seated in the supporting bracket 122 as shown in FIG. 8. The flange 128 is disposed near only one of the left and right edges of the screen when the latter is in its landscape position. In this example, the flange 128 is disposed near the right edge of the display screen 120 when in its landscape position, with no such flange being disposed near the left edge of the display screen 120. Thus, when the display screen 120 is disposed in a portrait position supported by the support bracket 122 as shown in FIG. 8, the flange 128 engages the actuator arm 132 causing the microswitch 130 to change state. Therefore, a change of state by both microswitches 124 and 130 represents that the display screen 120 is in a portrait position in which the right edge of the display screen is now the bottom edge. A change of state by the microswitch 124 but with no change of state by microswitch 130 represents that the display screen 120 is in a portrait position in which the right edge of the display screen is now the top edge. In this embodiment, microswitches 124 and 130 together perform the orientation sensor function and provide an indication when the landscape/portrait orientation has changed and also whether the display screen 120 was rotated 90 degrees clockwise or 90 degrees counterclockwise.

Figure 9:
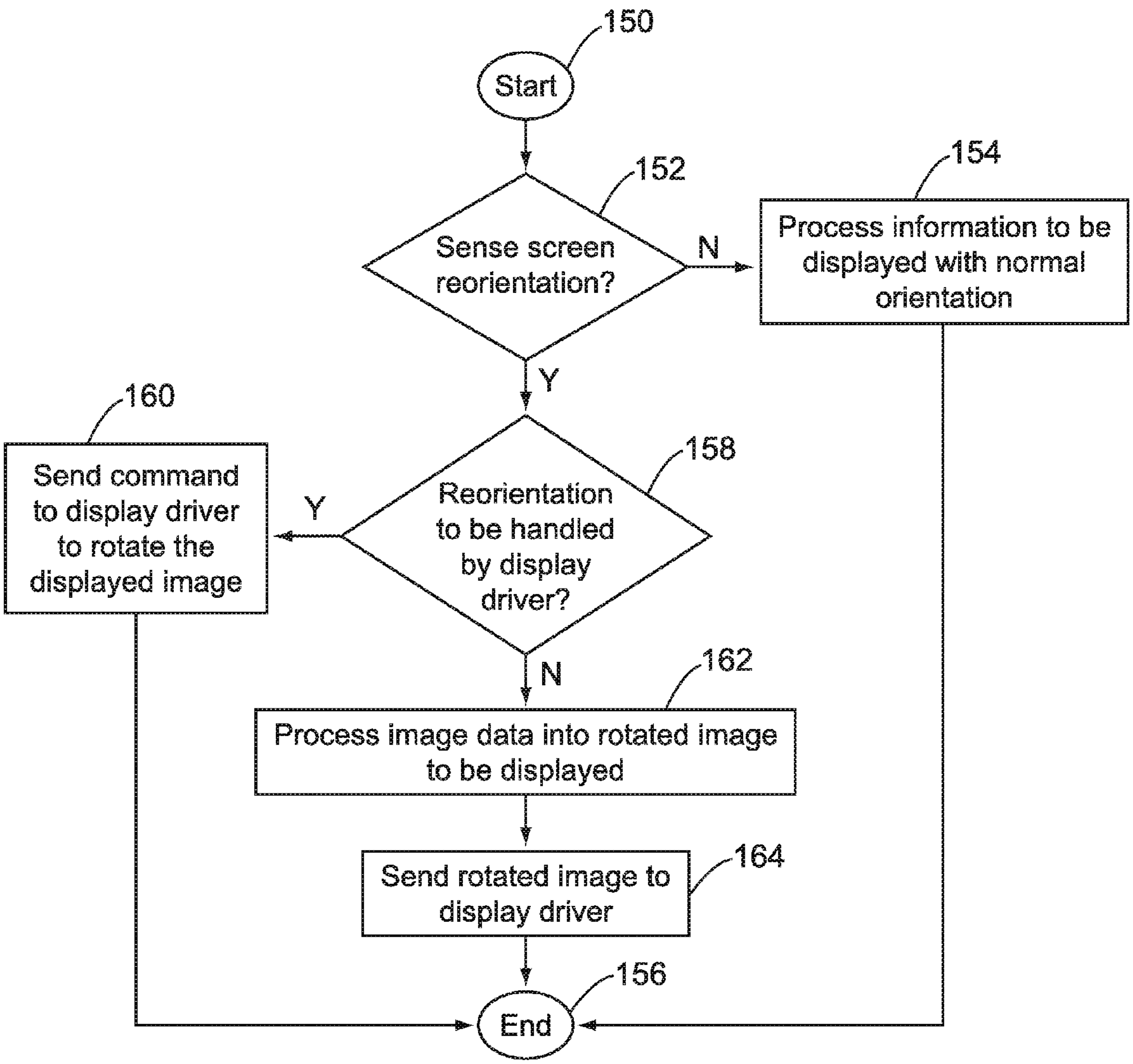
FIG. 9 is a flow diagram illustrating steps used to control the orientation of images displayed in accordance with an embodiment of the present invention.

FIG. 9 is a flow chart of exemplary steps of a method in accordance with the embodiment of the present invention. Beginning at Start 150, a determination is made by step 152 of whether a reorientation of the screen, e.g. by orientation sensor(s) 59, has been sensed. A NO determination by step 152 results in the information to be displayed being processed for a normal orientation format in accordance with step 154. In the illustrative example, FIG. 1 shows the display 50 with a normal landscape physical orientation, and in accordance with step 154, would result in information being displayed with a normal landscape format. The process terminates at End 156.

A YES determination by step 152 results in a further determination by step 158 of whether image reorientation is to be handled by the display driver. A YES determination by step 158 results in processing by step 160 in which the CPU sends a command to the display driver indicating that the display image is to be rotated from a landscape format to a portrait format. The display driver may comprise a computer graphics card having the capability to control the rendering of images in either a landscape or portrait format. Upon receiving such a command, the display driver will cause further images to be rendered in a portrait format. The process terminates at End 156.

A NO determination by step 158, indicating that an orientation change of the image to be displayed will not be handled by the display driver, results in processing of the image data by the CPU into a rotated image to be rendered on the display screen in step 162. That is, a remapping of display data of the pixels and/or vectors intended to be presented in a landscape format is made by the CPU into corresponding display data of the pixels/vectors for a portrait format. In step 164 the rotated image (reoriented display data) is transmitted from the CPU to the display driver for rendering on the screen of the display. The process terminates at End 156.

The steps or operations described herein are only examples. There may be many variations to these steps or operations without departing from the spirit of the invention. For instance, the steps may be performed in a differing order, or steps may be added, deleted, or modified. Although software is a preferred for implementation of the steps in the illustrative example, the functions of the software may be incorporated as part of firmware, a logic array, or hardware based logic.

Additional functions are performed by the illustrative embodiments of the present invention for an EGM that would not be encountered outside of gaming machines. For example, in the embodiment shown in FIGS. 1 and 2 a determination is not easily made of whether the display 50 has been manually relocated by a technician to another physical position in which the landscape/portrait orientation has been changed. Just because the display has been moved during servicing from the location normally used during the play of a game by a user does not automatically mean that the display is in a changed landscape/portrait physical orientation.

According to one aspect of the present disclosure, a method implemented by an EGM having a cabinet permits wagering on games. The method includes the acts of providing an electronic display mounted to the cabinet and disposed in a normal operational position to portray a wagering game to a user. The display, in its normal operational position, has an orientation of one of landscape or portrait. The method also includes moving the display from its normal operational position to a maintenance position in order to permit access for a technician to components in a space in the cabinet behind the display when the latter is in its normal operational position. The display, in its maintenance position, has an orientation of the other of landscape or portrait. The display, in its maintenance position, displays information to the technician. The method can further include receiving a signal from an orientation sensing mechanism supported by the cabinet. The signal represents whether the display is in its normal operational position having an orientation of one of landscape or portrait or in its maintenance position having an orientation of the other of landscape or portrait. The method can also provide that upon receiving the signal representing that the display is in its maintenance position, generating images on the display so that the images have one of a landscape or portrait format that matches the other of landscape or portrait orientation of the display. This permits the technician to view information presented on the display with a landscape or portrait format that matches the physical orientation of the display.

In certain embodiments, a step of generating the signal by a change of state by a mechanical switch from one state to another state includes the mechanical switch being triggered by the display being placed in its maintenance position. The method can also include the step of physically supporting the display by an actuator element of the mechanical switch when the display is in its maintenance position. The weight of the display upon the actuator element can cause the change of state by the mechanical switch from one state to another state. The mechanical switch can be triggered to change state by engagement with the display when the display is placed in its maintenance position. The mechanical switch can also be triggered to change state by engagement with an abutment that moves in response to movement of the display as the latter is placed in its maintenance position.

In certain embodiments, a step of generating another signal by a change of state by another mechanical switch from one state to another state includes the another mechanical switch being triggered by the display being placed in its maintenance position in one of a clockwise or counterclockwise 90 degree rotation from display in its normal operational position. The another mechanical switch is not triggered by the display being placed in its maintenance position in the other of the clockwise or counterclockwise 90 degree rotation from display in its normal operational position. The another signal automatically indicates the one of clockwise or counterclockwise rotation of the images in order to render text characters in a normal left to right row orientation.

In certain embodiments, a first area defined by the perimeter of the display in its normal operational position does not substantially overlap a second area defined by the perimeter of the display in its maintenance position so that access for servicing components of the EGM located in the first area is provided to the technician.

According to another aspect of the present disclosure, an EGM supports wagering on games and includes a cabinet and a microprocessor based system disposed in the cabinet. The microprocessor based system includes a central processing unit and memory for storing operating instructions and image data. An electronic display can be mounted to the cabinet for rendering images on a screen based on the image data. The electronic display is disposed in a normal operational position to portray a wagering game to a user. The display in its normal operational position has an orientation of one of landscape or portrait. The display is configured to be movable to a maintenance position in order to permit access for a technician to components in a space in the cabinet behind the display when the latter is in its normal operational position. The display in its maintenance position has an orientation of the other of landscape or portrait. The display in its maintenance position displays information to the technician. The EGM can also include an orientation sensing mechanism that generates a signal representative of whether the display is in the normal operational position having one of landscape or portrait physical orientation or in the maintenance position having the other of landscape or portrait physical orientation. In addition, the microprocessor based system can be adapted to, upon receiving the signal representing that the display is in the maintenance position, generate image data so that images on the display have one of a landscape or portrait format that matches the other of landscape or portrait physical orientation of the display. This permits the technician to view information presented on the display in its maintenance position with a landscape or portrait format that matches the corresponding landscape or portrait physical orientation.

In certain embodiments, the orientation sensing mechanism includes a sensor that generates the signal by a change from one state to another state. The sensor is triggered to change state due to sensing that the display is in the maintenance position. The sensor can also physically support the display by an actuator element of a mechanical switch when the display is in its maintenance position, where the weight of the display upon the actuator element causes the change of state by the mechanical switch from one state to another state. The orientation sensing mechanism can also include a mechanical switch that is triggered to change state by engagement with an abutment that moves in response to movement of the display to its maintenance position.

In certain embodiments, the orientation sensing mechanism can include a mechanical switch and also includes another mechanical switch generating another signal by a change of state by the another mechanical switch from one state to another state. The another mechanical switch can be triggered by the display being placed in the maintenance position in one of a clockwise or counterclockwise 90 degree rotation from display in its normal operational position. The another mechanical switch may not be triggered by the display being placed in its maintenance position by the other of the clockwise or counterclockwise 90 degree rotation from display from its normal operational position. The another signal can automatically indicating the one of clockwise or counterclockwise rotation of the images in order to render text characters in a normal left to right row orientation.

In certain embodiments, a first area is defined by the perimeter of the display at the normal operational position not substantially overlapping a second area defined by the perimeter of the display at the maintenance position so that access for servicing components of the EGM located in the first area is provided to the technician.

According to another aspect of the present disclosure, an EGM supports wagering on games and includes a microprocessor means for controlling the operation of a game and performing maintenance actions and a memory means for storing operating instructions and image data. An electronic display displays images on a screen based on the image data. A means for rendering images on the screen is based on the image data. The electronic display is disposed in a normal operational position to portray a wagering game to a user. The display in its normal operational position has an orientation of one of landscape or portrait. The display is configured to be movable to a maintenance position in order to permit access for a technician to components in a space in the cabinet behind the display when the latter is in its normal operational position. The display in its maintenance position has an orientation of the other of landscape or portrait. The display in its maintenance position displaying information to the technician. The EGM may further include a means for generating a signal representative of whether the display is in its normal operational position having one of landscape or portrait physical orientation or in its maintenance position having the other of landscape or portrait physical orientation. In addition, the EGM may include a microprocessor means adapted to upon receiving the signal representing that the displaying means is in its maintenance position, generate image data so that images on the screen have one of a landscape or portrait format that matches the other of landscape or portrait physical orientation of the display. This permits the technician to view information presented on the screen in the maintenance position with a landscape or portrait format that matches the corresponding landscape or portrait physical orientation.

In certain embodiments, the signal generating means includes a mechanical switch that is triggered to change state by engagement with the display when the display is placed in the maintenance position. It is contemplated that in one embodiment the signal generating means includes a mechanical switch that is triggered to change state by engagement with an abutment that moves in response to movement of the display as the latter is placed in the maintenance position.

In certain embodiments, the signal generating means comprises a mechanical switch and another mechanical switch where the latter generates another signal by a change of state by the another mechanical switch from one state to another state. The another mechanical switch is triggered by the display being placed in the maintenance position in one of a clockwise or counterclockwise 90 degree rotation from display in its normal operational position. The another mechanical switch is not triggered by the display being placed in the maintenance position in the other of the clockwise or counterclockwise 90 degree rotation from display in its normal operational position. Furthermore, the another signal automatically indicates the one of clockwise or counterclockwise rotation that the images should be rotated in order to render text characters in a normal left to right row orientation.

According to another aspect of the present disclosure, a method is implemented on an EGM giving a cabinet. The method includes the steps of providing an electronic display rotatably mounted to the cabinet and disposed in a normal operational position to portray a wagering game to a user. The display has a screen that is disposed in a first plane in the normal operational position of the display. The display is rotated from its normal operational position to a maintenance position in order to permit access for a technician to components in a space in the cabinet behind the display when the latter is in its normal operational position. The screen of the display remains substantially parallel to the first plane throughout the rotation of the display to its maintenance position. It is contemplated that in certain embodiment, the method further includes the step of moving the display away from the cabinet while the screen remains parallel to the first plane with the display being supported by an extendable rod that slides within a sleeve mounted to the cabinet. The display may further be supported by a single extendable rod that slides within a sleeve mounted to the cabinet. In addition, the display may also be rectangular and the single extendable rod attached to the display at a location closer to a corner of the display than to the center of the display so that the rotation of the display to its maintenance position causes the display to swing substantially away from the space in the cabinet behind the display when the latter is in its normal operational position.

It is also contemplated that in certain embodiments, the method includes the step of receiving a signal from an orientation sensing mechanism supported by the cabinet, where the signal represents whether the display is in its normal operational position having an orientation of one of landscape or portrait or in its maintenance position having an orientation of the other of landscape or portrait. Furthermore, upon receiving the signal representing that the display is in its maintenance position, images are generated on the display so that the images have one of a landscape or portrait format that matches the other of landscape or portrait orientation of the display to permit the technician to view information presented on the display with a landscape or portrait format that matches the physical orientation of the display. The method may further include the step of generating the signal by a change of state by a mechanical switch from one state to another state, where the mechanical switch is triggered by the display being placed in its maintenance position. In certain embodiments, the mechanical switch is triggered to change state by engagement with an abutment that moves in response to movement of the display as the latter is placed in its maintenance position.

It is contemplated that the method may have a first area defined by the perimeter of the display in its normal operational position that does not substantially overlap a second area defined by the perimeter of the display in its maintenance position so that access for servicing components of the EGM located in the first area is provided to the technician.

Each of these embodiments and obvious variations thereof are contemplated as falling within the spirit and scope of the claimed invention, which is set forth in the following claims.

What is claimed is:

1. A method implemented by an electronic gaming machine (EGM) that permits wagering on games, the EGM having a cabinet, the method comprising the steps of:

providing an electronic display mounted to the cabinet and disposed in a normal operational position to portray a wagering game to a user, the normal operational position of the display having an orientation of landscape or portrait; and moving the display from the normal operational position to a maintenance position thereby permitting access for a technician to components in a space in the cabinet behind the display when the display is in the normal operational position, the maintenance position having an orientation of the other of landscape or portrait, the display in the maintenance position displaying information to the technician, wherein a first area defined by the perimeter of the display in the normal operational position does not substantially overlap a second area defined by the perimeter of the display in the maintenance position so that access for servicing components of the EGM located in the first area is provided to the technician.

2. The method of claim 1, further comprising the steps of:

receiving a signal from an orientation sensing mechanism supported by the cabinet, where the signal represents whether the display is in the normal operational position having an orientation of one of landscape or portrait or in the maintenance position having an orientation of the other of landscape or portrait; and upon receiving the signal representing that the display is in the maintenance position, generating images on the display so that said images have one of a landscape or portrait format that matches the other of landscape or portrait orientation of the display, thereby permitting the technician to view information presented on the display with a landscape or portrait format that matches the physical orientation of the display.

3. The method of claim 2, further comprising the step of generating the signal by a change of state by a mechanical switch from one state to another state, the mechanical switch being triggered by the display being placed in the maintenance position.

4. The method of claim 3, further comprising the step of physically supporting the display by an actuator element of the mechanical switch when the display is in the maintenance position, where the weight of the display upon the actuator element causes the change of state by the mechanical switch from one state to another state.

5. The method of claim 3, wherein the mechanical switch is triggered to change state by engagement with the display when the display is placed in the maintenance position.

6. The method of claim 3, wherein the mechanical switch is triggered to change state by engagement with an abutment that moves in response to movement of the display to the maintenance position.

7. The method of claim 3, further comprising the step of generating another signal by a change of state by another mechanical switch from one state to another state, the another mechanical switch being triggered by the display being placed in the maintenance position in one of a clockwise or counterclockwise 90 degree rotation from display in the normal operational position, the another mechanical switch not being triggered by the display being placed in the maintenance position in the other of the clockwise or counterclockwise 90 degree rotation from display in the normal operational position, the another signal automatically indicating the one of clockwise or counterclockwise rotation of the images in order to render text characters in a normal left to right row orientation.

8. An electronic gaming machine (EGM) that supports wagering on games comprising:

a cabinet;

microprocessor based system, disposed in the cabinet, that includes a central processing unit and memory for storing operating instructions and image data; and an electronic display, mounted to the cabinet, for rendering images on a screen based on the image data, the electronic display disposed in a normal operational position to portray a wagering game to a user, the display in the normal operational position having an orientation of one of landscape or portrait, the display configured to be movable to a maintenance position in order to permit access for a technician to components in a space in the cabinet behind the display when the display is in the normal operational position, the display in the maintenance position having an orientation of the other of landscape or portrait, the display in the maintenance position displaying information to the technician, wherein a first area defined by the perimeter of the display at the normal operational position does not substantially overlap a second area defined by the perimeter of the display at the maintenance position so that access for servicing components of the EGM located in the first area is provided to the technician.

9. The EGM of claim 8, further comprising:

an orientation sensing mechanism that generates a signal representative of whether the display is in the normal operational position having one of landscape or portrait physical orientation or in the maintenance position having the other of landscape or portrait physical orientation; and the microprocessor based system adapted to, upon receiving the signal representing that the display is in the maintenance position, generate image data so that images on the display have one of a landscape or portrait format that matches the other of landscape or portrait physical orientation of the display, thereby permitting the technician to view information presented on the display in the maintenance position with a landscape or portrait format that matches the corresponding landscape or portrait physical orientation.

10. The EGM of claim 9, wherein the orientation sensing mechanism comprises a sensor that generates the signal by a change from one state to another state, the sensor being triggered to change state due to sensing that the display is in the maintenance position.

11. The EGM of claim 9, wherein the sensor physically supports the display by an actuator element of a mechanical switch when the display is in the maintenance position, where the weight of the display upon the actuator element causes the change of state by the mechanical switch from one state to another state.

12. The EGM of claim 9, wherein the orientation sensing mechanism comprises a mechanical switch that is triggered to change state by engagement with an abutment that moves in response to movement of the display to the maintenance position.

13. The EGM of claim 9, wherein the orientation sensing mechanism comprises a mechanical switch and further comprises another mechanical switch generating another signal by a change of state by the another mechanical switch from one state to another state, the another mechanical switch being triggered by the display being placed in the maintenance position in one of a clockwise or counterclockwise 90 degree rotation from display in the normal operational position, the another mechanical switch not being triggered by the display being placed in the maintenance position by the other of the clockwise or counterclockwise 90 degree rotation from display from the normal operational position, the another signal automatically indicating the one of clockwise or counterclockwise rotation of the images in order to render text characters in a normal left to right row orientation.

14. An electronic gaming machine (EGM) that supports wagering on games comprising:

a microprocessor means for controlling the operation of a game and performing maintenance actions;

memory means for storing operating instructions and image data;

an electronic display for displaying images on a screen based on the image data; and means for rendering images on the screen based on the image data, the electronic display disposed in a normal operational position to portray a wagering game to a user, the display in the normal operational position having an orientation of one of landscape or portrait, the display configured to be movable to a maintenance position thereby allowing access for a technician to components in a space in the cabinet behind the display when the latter is in the normal operational position, the display in the maintenance position having an orientation of the other of landscape or portrait, the display in the maintenance position displaying information to the technician.

15. The EGM of claim 14, further comprising:

means for generating a signal representative of whether the display is in the normal operational position having one of landscape or portrait physical orientation or in the maintenance position having the other of landscape or portrait physical orientation; and the microprocessor means adapted to, upon receiving the signal representing that the displaying means is in the maintenance position, generate image data so that images on the screen have one of a landscape or portrait format that matches the other of landscape or portrait physical orientation of the display, thereby permitting the technician to view information presented on the screen in the maintenance position with a landscape or portrait format that matches the corresponding landscape or portrait physical orientation.

16. The EGM of claim 15, wherein the signal generating means comprises a mechanical switch that is triggered to change state by engagement with the display when the display is placed in the maintenance position.

17. The EGM of claim 15, wherein the signal generating means comprises a mechanical switch that is triggered to change state by engagement with an abutment that moves in response to movement of the display as the latter is placed in the maintenance position.

18. The EGM of claim 15, wherein the signal generating means comprises a mechanical switch and another mechanical switch where the latter generates another signal by a change of state by the another mechanical switch from one state to another state, the another mechanical switch being triggered by the display being placed in the maintenance position in one of a clockwise or counterclockwise 90 degree rotation from display in the normal operational position, the another mechanical switch not being triggered by the display being placed in the maintenance position in the other of the clockwise or counterclockwise 90 degree rotation from display in the normal operational position, the another signal automatically indicating the one of clockwise or counterclockwise rotation that the images should be rotated in order to render text characters in a normal left to right row orientation.

19. A method implemented by an electronic gaming machine (EGM) that permits wagering on games, the EGM having a cabinet, the method comprising the steps of:

providing an electronic display rotatably mounted to the cabinet and disposed in a normal operational position to portray a wagering game to a user, the display having a screen that is disposed in a first plane in the normal operational position of the display;

rotating the display from the normal operational position to a maintenance position in order to permit access for a technician to components in a space in the cabinet behind the display when the display is in the normal operational position, the screen of the display remaining substantially parallel to the first plane throughout the rotation of the display to the maintenance position; and moving the display away from the cabinet while the screen remains parallel to the first plane with the display being supported by an extendable rod that slides within a sleeve mounted to the cabinet.

20. The method of claim 19, wherein the display is supported by a single extendable rod that slides within a sleeve mounted to the cabinet.

21. The method of claim 20, wherein the display is rectangular and the single extendable rod is attached to the display at a location closer to a corner of the display than to the center of the display so that the rotation of the display to the maintenance position causes the display to swing substantially away from the space in the cabinet behind the display when the display is in the normal operational position.

22. A method implemented by an electronic gaming machine (EGM) that permits wagering on games, the EGM having a cabinet, the method comprising the steps of:

providing an electronic display rotatably mounted to the cabinet and disposed in a normal operational position to portray a wagering game to a user, the display having a screen that is disposed in a first plane in the normal operational position of the display;

rotating the display from the normal operational position to a maintenance position in order to permit access for a technician to components in a space in the cabinet behind the display when the display is in the normal operational position, the screen of the display remaining substantially parallel to the first plane throughout the rotation of the display to the maintenance position;

receiving a signal from an orientation sensing mechanism supported by the cabinet, wherein the signal represents whether the display is in the normal operational position having an orientation of one of landscape or portrait or in the maintenance position having an orientation of the other of landscape or portrait; and upon receiving the signal representing that the display is in the maintenance position, generating images on the display so that said images have one of a landscape or portrait format that matches the other of landscape or portrait orientation of the display, thereby permitting the technician to view information presented on the display with a landscape or portrait format that matches the physical orientation of the display.

23. The method of claim 22, further comprising the step of generating the signal by a change of state by a mechanical switch from one state to another state, the mechanical switch being triggered by the display being placed in the maintenance position.

24. The method of claim 23, wherein the mechanical switch is triggered to change state by engagement with an abutment that moves in response to movement of the display as the display is placed in the maintenance position.

25. A method implemented by an electronic gaming machine (EGM) that permits wagering on games, the EGM having a cabinet, the method comprising the steps of:

providing an electronic display rotatably mounted to the cabinet and disposed in a normal operational position to portray a wagering game to a user, the display having a screen that is disposed in a first plane in the normal operational position of the display; and rotating the display from the normal operational position to a maintenance position in order to permit access for a technician to components in a space in the cabinet behind the display when the display is in the normal operational position, the screen of the display remaining substantially parallel to the first plane throughout the rotation of the display to the maintenance position, wherein a first area defined by the perimeter of the display in the normal operational position does not substantially overlap a second area defined by the perimeter of the display in the maintenance position so that access for servicing components of the EGM located in the first area is provided to the technician.

* * * * *